March 15, 1949.    A. C. PRICHARD    2,464,258
RADIO APPARATUS
Filed Jan. 4, 1945    3 Sheets-Sheet 1

*INVENTOR.*
ARTHUR C. PRICHARD
BY William D. Hall
ATTORNEY

INVENTOR.
ARTHUR C. PRICHARD
BY William D. Hall
ATTORNEY

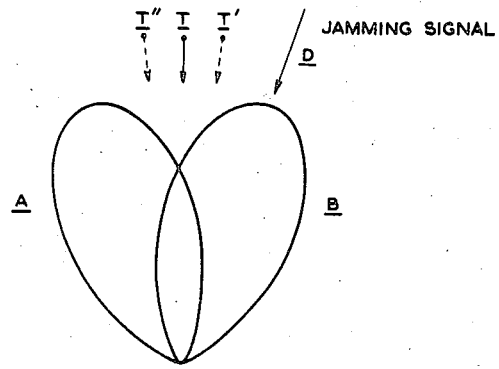
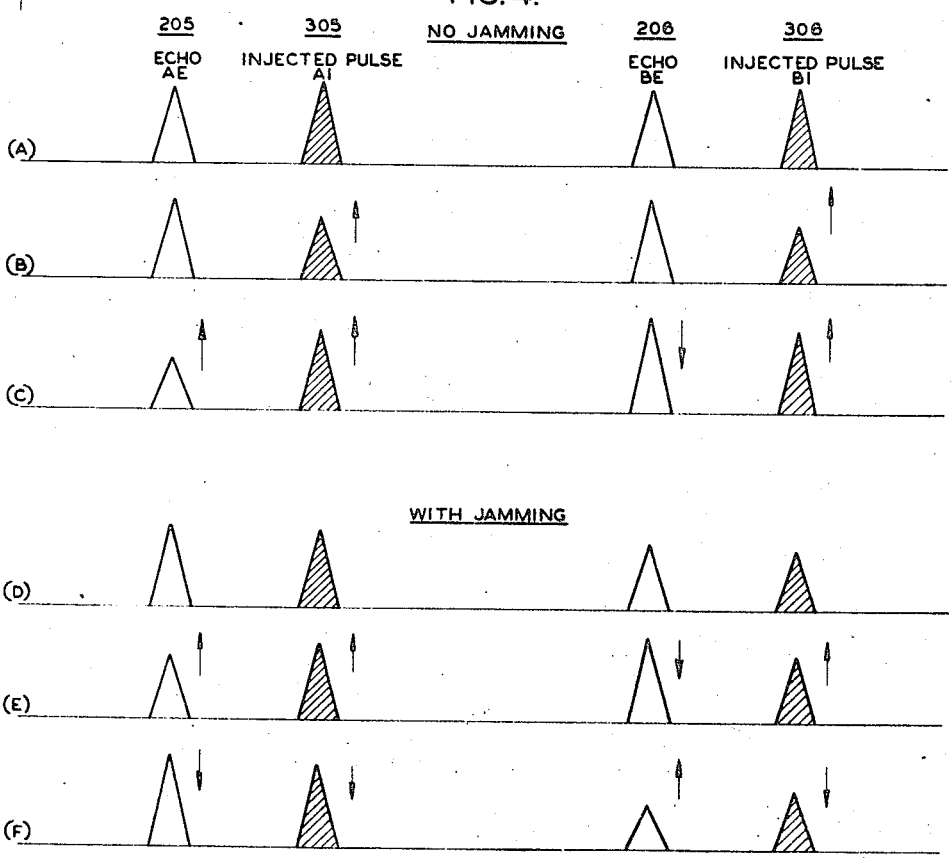

Patented Mar. 15, 1949

2,464,258

UNITED STATES PATENT OFFICE 2,464,258

RADIO APPARATUS

Arthur C. Prichard, Elberon, N. J., assignor to the United States of America as represented by the Secretary of War Application January 4, 1945, Serial No. 571,348

15 Claims. (Cl. 343—117)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to object detection systems of the pulse-echo type, and particularly to a method and means for automatic bearing determination, or tracking, of a reflecting object or target.

One type of bearing tracking system, commonly called "double-tracking" involves the reception of an echo with an antenna having two diverging, partially-overlapping response lobes, and then comparing the relative amplitudes of the echoes received on said lobes. Prior methods of automatic bearing tracking involve the selection of a given target echo, segregation and integration of the echo pulses received in the two antenna lobes, and comparison of the integrated energy from the respective lobes to derive a resultant voltage having a polarity which depends upon the direction of the tracking error. Said voltage is then applied to an antenna servo-motor system which rotates the antenna in the proper direction until the integrated energy from one lobe is equal to that from the other lobe, at which time the antenna is "on target." For a description of a system of this type reference is made to the application of Huber et al., Serial No. 478,862, filed March 12, 1943.

Such methods are adequate if the echo is received in the absence of jamming. However, jamming which originates along a direction which is different from the echo direction, affects one lobe more than the other, so that the energy from said one lobe may overload the receiver more than that from the other lobe. Since under varying conditions of overload the response of the receiver varies, equal echo signals on said lobes will not produce equal outputs in the receiver. If a non-linear detector is used, the same conditions will prevail even when no overloading is produced. Under such conditions, it is obvious that erroneous bearing tracking will result if the lobes are so oriented that equality of response from said lobes is obtained. This effect is most frequent and pronounced if the jamming is of the continuous wave type.

It is a principal object of the invention to provide an automatic tracking means in conjunction with a lobe shifted receiver system which will correctly track the bearing of a target in the presence of jamming conditions above described. In accordance with this invention, an artificial R.-F. pulse is injected into the receiver in the vicinity of the reception of each echo pulse, whereby the injected pulse and echo pulse will be at all times translated by the receiver under the same conditions of jamming. The echo and sampling pulse potentials in the receiver output are then compared to derive a resultant potential which is used to operate a servo system which drives the antenna until the two potentials have a predetermined relation.

For a better understanding of the invention, together with other and further objects thereof, reference is had to the following description taken in connection with the accompanying drawings, wherein:

Figs. 3 and 4 are theoretical diagrams illustrating the operation of the invention.

Figure 1:
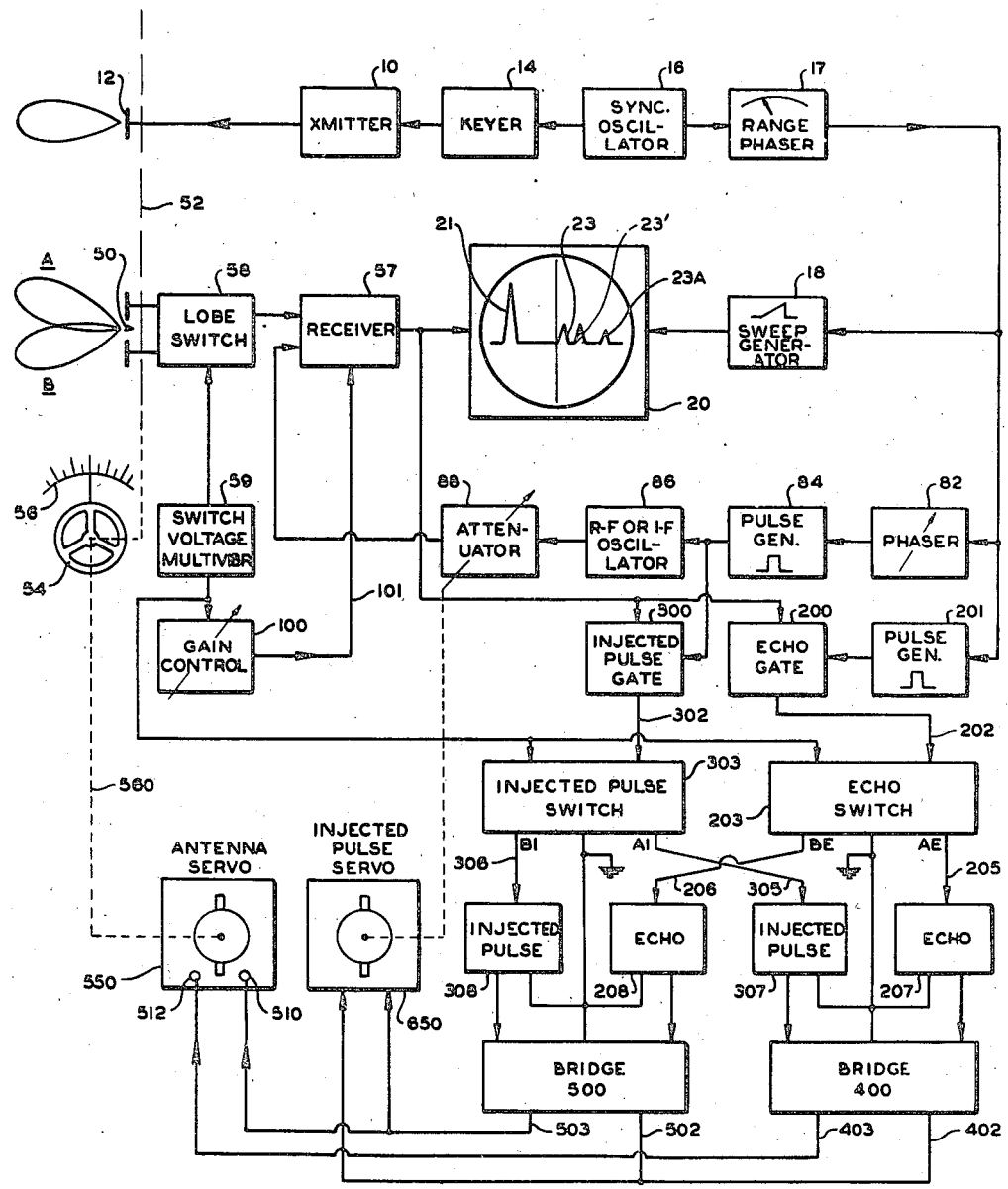
Fig. 1 is a block diagram of the invention.

In Fig. 1, there is shown a preferred embodiment of the invention as applied to a typical pulse-echo object-detection system. Said system includes a normally blocked radio transmitter 10 coupled to a directional dipole array 12. The transmitter is intermittently rendered operative by spaced, positive pulses from a keyer 14 which operates under the control of a sine-wave synchronizing oscillator 16, operating at a frequency generally in the audio region. In a manner well known in the art, keyer 14 generates a sharp positive pulse at every cycle, or plurality of cycles, of the wave from oscillator 16. Each positive pulse will, in turn, unblock transmitter 10, whereby spaced R.-F. wave trains, or pulses, are generated and transmitted from antenna 12.

In timed relation with each R.-F. pulse, a sweep generator 18, also controlled by synchronizing oscillator 16 and by a range phaser 17, generates a saw-tooth wave which is impressed upon the horizontal deflecting plates of a cathode-ray range-indicating oscilloscope 20 to provide a horizontal time-base therefor.

Echoes of the transmitted pulses are received on a dual-lobe antenna array 50 mounted on a common support with transmitting antenna 12. A common reflecting screen 52 renders both antennas unidirectional. The antenna support is mounted for rotation so that the antennas can be pointed in any desired direction under the control of a manual or power-operated positioning control element 54 having associated therewith a scale and pointer 56 for indicating the effective direction of the antenna array.

The signals received along the respective lobes of antenna 50 are alternately applied, through a continuously operating electronic lobe-switch 58, to a receiver 57, the output of which is applied to the vertical plates of oscilloscope 20, so that both the transmitted pulses and received echoes will vertically deflect the trace to form signal-indicating "pips" as shown in the drawing, wherein 21 indicates the transmitted pulse, while 23 and 23A indicate echoes of said pulse. The range, i. e., the distance to the target, is determined by means of oscilloscope 20 in conjunction with range-measuring phase shifter 17, as follows: Phase shifter 17 is first adjusted until the transmitted pulse pip 21 is positioned at the center hairline of the oscilloscope. The pointer of phase shifter 17 is then adjusted until it is at the zero point on the scale. The phase shifter 17 is then adjusted to change the phase of the sweep of generator 18 until the echo pip 23 is at the hairline, as shown in the drawing. The pointer will then indicate on said scale, which is directly calibrated in distance units, the range of the target.

Lobe switch 58 comprises two amplifiers, each of which is excited by the output of one of the lobes A and B of antenna 50. Said amplifiers are alternately made operative by a pair of oppositely-phased square-wave switching voltages generated by a flip-flop multivibrator 59, which may operate at a frequency as high as several thousand cycles per second. In this manner the signals on each lobe are alternately impressed upon the input of the receiver and alternately translated thereby. For a more detailed description of this circuit, reference is made to the Huber et al. application, above cited.

Figure 2:
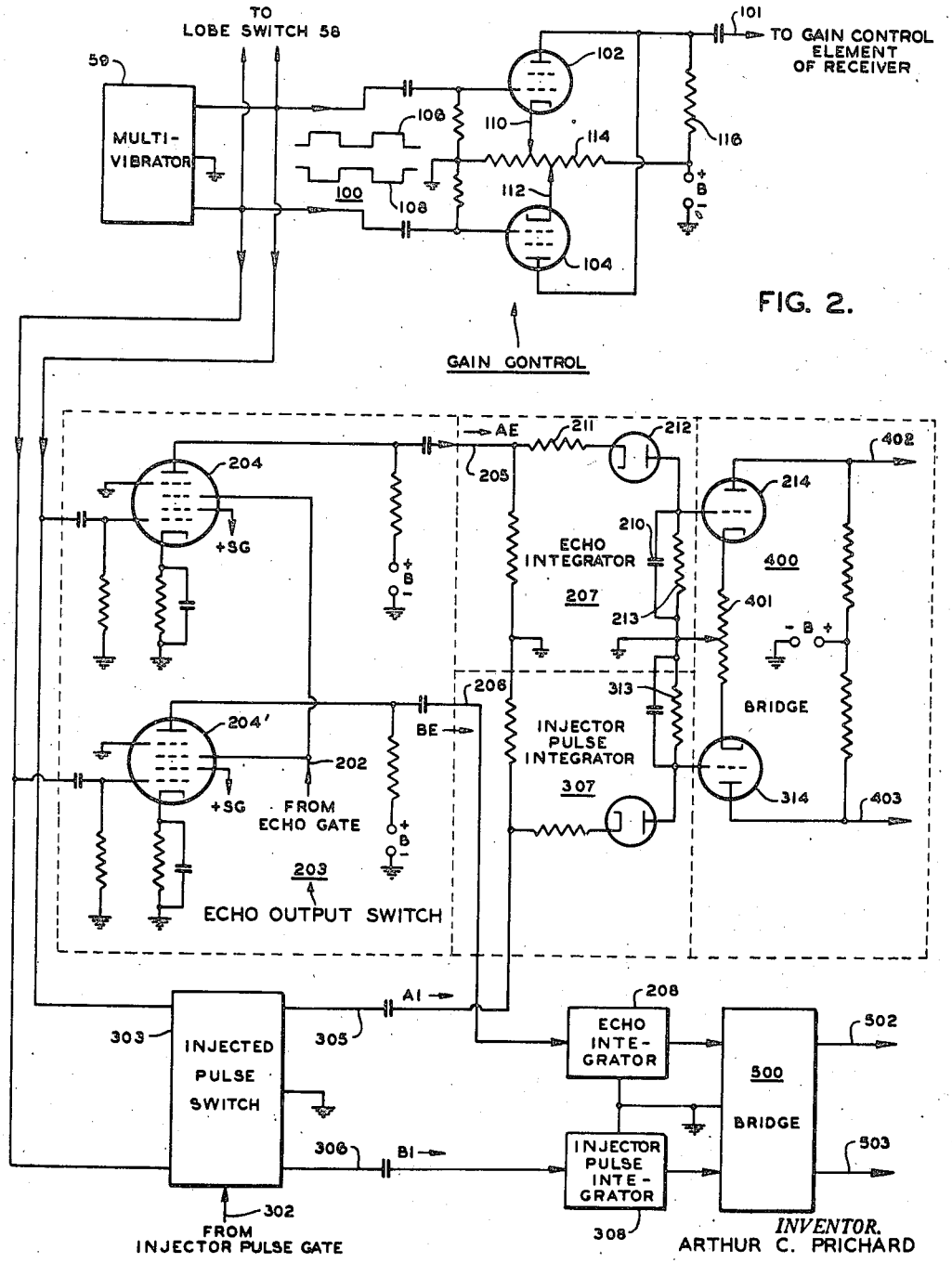
Fig. 2 is a circuit diagram of certain components of Fig. 1.

The output of multivibrator 59 is also applied to a gain control circuit 100, the output potential of which is applied, thru a lead 101, to a gain control element of receiver 57 in a manner well known in the art. Gain control 100 provides means for independently controlling the gain of the receiver to currents from the two lobes. As shown in Fig. 2, this circuit comprises two tubes 102 and 104 the outputs of which are varied by the oppositely-phased square waves 106 and 108 supplied by multivibrator 59. The gain of tubes 102 and 104 can be independently adjusted by means of movable sliders 110 and 112 of a potentiometer 114 connected across the B-supply. The plates of both tubes 102 and 104 are connected to a common load resistor 116, the output of which is impressed across the gain controlled stages of the receiver. By adjusting sliders 110 and 112, the gain of said receiver can be separately adjusted for each antenna lobe. Thus, the receiver sensitivity can be reduced to prevent complete saturation or increased to insure translation of a very weak signal by the receiver. If these conditions are not present to any great extent, the gain control feature may be omitted.

A means is provided to inject into the receiver 57 a sampling pulse slightly displaced in time from the reception of the desired echo pulse. For this purpose the output of range phaser 17 is passed through a phaser 82, which may be adjustable, to a square-wave generator 84, which periodically pulses a radio-frequency sampling-signal oscillator 86 of relatively low power. The output of the oscillator is injected, through an adjustable attenuator 88, into an R.-F. or L.-F. circuit of the receiver. The point of injection is such that the gain of the stages of the receiver preceding said point are not affected by the interference level. If necessary the sampling signal may be injected into antenna lobe circuits of the receiver. If the automatic gain-control circuit 100 is used, however, the sampling signal pulse must be injected at a point prior to the circuit which is gain controlled.

The injected signal should, preferably, have the same characteristics as the received echo signal, e. g. frequency, pulse width, etc. The injected pulse is indicated on the oscilloscope adjacent to the echo pulse indication 23, as indicated by the shaded pulse indication 23'. Phaser 82 should, preferably, be adjusted to move the pulse indication 23' as close to echo indication 23 as possible.

The echo and injected pulses in the output of receiver 57 are applied to an echo gate 200 and an injected-pulse gate 300, both of which are normally blocked by a cutoff bias. Echo gate 200 is rendered conducting by a square-wave gating pulse of short duration from a pulse generator 201 which is under the control of range phaser 17. The gating pulse is so timed that it occurs exactly at the interval when the trace on the oscilloscope 20 is at the center hairline, so that only the echo 23 which appears adjacent to said hairline will pass thru echo gate 200. The duration of said gating pulse should therefore be of the same order as the duration of the desired echo.

Injected-pulse gate 300 is rendered conducting by the square wave output of pulse generator 84, which also controls operation of the injected-signal oscillator 86. Hence gate 300 is open only when the signal 23', which accompanies the desired echo 23, is being injected into the receiver. Thus the output lead 202 will contain only desired echo pulses from both antenna lobes, while output lead 302 will contain only the accompanying injected pulses.

To separate the echoes received on the two lobes and to separate the injected signals accompanying said echoes, the outputs of echo gate 200 and injected pulse gate 300 are respectively passed through an echo switch 203 and an injected-pulse switch 303, both of the electronic type. As shown in Fig. 2, echo switch 203, comprises two normally-blocked multigrid tubes 204 and 204' each having one of their grids fed by the output of echo gate 200 over lead 202. Another grid of each tube is coupled to the output of multivibrator 59 so that said tubes are rendered alternately conducting by the oppositely-phased square waves 106 and 108 in synchronism with the switching of the antenna lobes. Thus, echoes received along antenna lobe A will appear in the output lead 205 of tube 204, while echoes received along lobe B will appear in the output lead 206 of tube 204'.

Injected-pulse switch 303 is constructed exactly as echo switch 203, and is controlled by the oppositely-phased square waves from multivibrator 59 and by the output of injected pulse gate 300 over a lead 302. Thus, the injected pulses which accompany the echoes from lobe A will appear in output lead 305, while the injected pulses which accompany the echoes from lobe B will appear in output lead 306.

The four pulse outputs of the above-described switching circuits are separately integrated by four like integrating circuits 207, 208, 307, and 308, each comprising a storage capacitor 210 and a charging circuit comprising a resistor 211 and diode 212. A discharge resistor 213 is shunted across capacitor 210. Resistance 211 is a minor fraction of resistance 213, whereby the charging time is of the order of the pulse duration while the discharge time is considerably greater, so that the input pulses are integrated and a substantially steady voltage is built up across the condenser 210, which voltage is proportional to the pulse amplitude and repetition rate. Thus, since the repetition rates of all pulses are equal, the steady potential across resistor 213 will be proportional to the amplitude of the echoes in the receiver output due to signals received along lobe A, while the steady potential across resistor 313 will be proportional to the amplitude of the injected pulses accompanying said echoes. These two potentials are compared by applying them to the grids of two like electron tubes 214 and 314 which form two like resistance arms of a voltage comparing circuit in the form of a conventional bridge 400. Said tubes are connected in series with a resistor 401 having an adjustable center contact to compensate for slight differences in the two tubes.

The potentials across resistors 213 and 313 will control the plate resistance of tubes 214 and 314, respectively, and thus control the balance of the bridge. Hence the magnitude of the resultant voltage across the output terminals 402 and 403 of the bridge will be substantially proportional to the difference in amplitude between the echo pulse received on antenna lobe A and its accompanying injected pulse. The polarity of said resultant voltage will be dependent upon which type of pulse if of greater amplitude.

The outputs of integrators 206 and 306, corresponding respectively to signals received on lobe B and its accompanying injected signal, are also compared in a bridge 500, the structure and functions of these components being the same as those above-described.

The outputs of bridges 400 and 500 are connected in series opposition and applied through terminals 510 and 512, to a servo-motor system 550 which rotates the antenna system 50 in either direction, as indicated by the broken line 560. The output of either one of the bridges, in this case bridge 500, is coupled to a similar servo system 650, which rotates the injected-pulse attenuator 88. Said servo-motor systems are of the well-known type in which the direction of rotation is dependent upon the polarity of the applied potential, and the speed of response is dependent upon the magnitude of said potential.

One system of this type is known by the trademark "Amplidyne." Servo system 650 can be eliminated by making attenuator 88 electronic. This can be done by making it in the form of an amplifier, and impressing the output of bridge 500 to a gain control electrode of said amplifier.

This completes the description of the invention. Its operation to provide automatic tracking will now be discussed. Spaced pulses of wave energy are transmitted by antenna 12 and echoes from targets are detected by dual-lobe antenna 50 and translated by receiver 57. Pulses of uniform amplitude provided by oscillator 86 are also injected into a circuit of the receiver and, by adjustment of phaser 82, appear in the receiver output immediately following (or preceding if desired) the echo from the target it is desired to track, as observed on oscilloscope 20. The two sets of pulses in the receiver output are again separated by gates 200 and 300 so that the echoes received on both lobes appear in output lead 202 while the accompanying injected pulses appear in output lead 302. Each pair of echoes and injected pulses are now separated by switches 203 and 303 so that the echo outputs due to signals on lobes A and B will appear in output leads 205 and 206, respectively, while their accompanying injected signals will appear in output leads 305 and 306, respectively.

Each of said outputs is now separately integrated and the resultant voltage due to each echo output is compared with the voltage due to the accompanying injected pulse output in bridges 400 and 500 which operate servo-motors as above described.

Let it be assumed that the antenna 50 is on-target with respect to a reflecting object at T, in Fig. 3, and that no jamming signal is present. The signal levels in the circuits 205, 305, 206, and 306 will then be as indicated in Fig. 4A, wherein the unshaded pulses AE and BE represent amplitudes of echoes in the output of the receiver as a result of signals impressed thereon from antenna lobes A and B respectively; and the shaded pulses AI and BI represent amplitudes of injected signals in the receiver output which accompany pulses AE and BE, respectively.

Figure 4A shows that for an on-target condition all four pulses are of equal amplitude. The outputs of bridges 400 and 500 will then be zero and the antennas will remain stationary. It is assumed here that the amplitude of each injected pulse output AI and BI is also equal to that of its accompanying echo output AE and BE, respectively. This is not necessarily so, as is shown in Fig. 4B, which illustrates another possible on-target condition, and wherein both echoes are equal and both injected pulses are equal, but the injected pulses are greater or less than the echo pulses. Under such a condition, both bridges 400 and 500 produce outputs, but since they are in opposition, they will cancel each other, and therefore antenna servo 550 will remain stationary off the target. However, the output of bridge 500 will operate servo system 650 which will rotate the attenuator 88 and vary the output of injected-pulse generator 86 in such sense as to equalize pulse BI with BE. At the same time this must necessarily equalize pulses AI and BI.

If the target moves to T', so that the echoes arrive along a direction shown by the dotted arrow, and there is still no jamming, then the antennas will be normally off target and the relative pulse amplitudes will be as shown in Fig. 4C, since lobe B will be more responsive to the echo from target T' than lobe A. Since BE is greater than BI, bridge 400 will yield an output which will operate servo 650 to cause attenuator 88 to increase the amplitudes of BI and AI so that BI and BE will tend to become equalized. But when this occurs, the difference of the amplitudes between AE and AI will be even further exaggerated so that bridge 500 will yield an output which will cause antenna servo 550 to rotate antenna 50 in the proper direction to increase AE so as to equalize it with AI. This will at the same time reduce BE until all four pulses are equalized as shown in Fig. 4A.

From the above description it will be clear that if the target is at T'', the antenna 50 will be rotated in the opposite direction until all four pulses are equal.

Now let it be assumed that the antenna is on-target with respect to a target at T so that the pulse amplitudes are as shown in Fig. 4A. If a jamming signal should now come in from a direction D so that it is more strongly received on lobe B than it is on lobe A, and hence will tend to overload the receiver when it is coupled to lobe B by the lobe switch, then the receiver will amplify the signals a lesser amount than when it is coupled to lobe A. Under such conditions, the relative signal amplitudes will be as shown in Fig. 4D, which shows output pulses AE and BE to be unequal even though the antenna lobes are in an on-target position, and hence their inputs to the receiver are equal. However, the outputs resulting from the accompanying injected pulses AI and BI are also unequal, but equal to the echoes AE and BE, respectively. Since unequal pulses AI and BI are the result of equal pulses injected into the receiver from oscillator 86, the inequality of the output pulses is due to the effect of unequal jamming received on the two antenna lobes. Hence, unequal pulses AE and BE are also the result of equal echoes received on lobes A and B.

In other words, since equal injected signals cause unequal responses AI and BI, and since AI equals AE and BI equals BE, then the signals causing AE and BE must be equal, since they were all handled by the same receiver under the same conditions of jamming and were therefore amplified in the same ratio. This is the condition for correct tracking of the target and the servomotor 550 should remain stationary. This condition will be found to exist because signals AE and AI are compared by bridge 400 and, since said signals are equal, the output of bridge 400 is zero. Similarly, equal signals BE and BI will produce zero output in bridge 500, so that the resultant potential applied to servo systems 550 and 650 will be zero. If the amplitude of the signal from oscillator 86, which is injected into the receiver, is such that outputs AI and BI are not equal to outputs AE and BE respectively, the bridge 500 will be unbalanced and yield a potential that will operate servo-motor 550 which, in turn, will rotate attenuator 88 in the proper direction to equalize AI with AE, and BI with BE, as above explained.

If the target T should move to a position at T' while the jamming signal remains the same, the echo received on lobe B will increase while that on lobe A will decrease, so that the relative signal amplitudes will change from that shown in Fig. 4D to that shown in 4E, where the injected pulse output is larger than the echo output AE, but less than echo output BE. This will tend to unbalance bridge 500 and operate attenuator 88 to increase BI to equalize it with BE. However, this will at the same time also increase AI so as to make it even greater than AE and increase the unbalance of bridge 400 so that the antenna will be rotated in such direction as to increase AE and decrease BE until the relative pulse amplitudes are again as shown in Fig. 4D, in which state the antennas are now properly oriented toward target T'.

If the target T travels toward the position T'', then the relative pulse amplitudes will change from that shown at Fig. 4D to that shown at Fig. 4F. From the above analysis of operation, it will be obvious that the antenna and attenuator servos will operate to vary the pulses in Fig. 4F in the directions indicated by the arrows until the pulses again have the amplitude relations shown in Fig. 4A, which relations will be obtained when the antenna is on-target with respect to target position T''.

From the above examples of operation of the system, the behavior of the circuits can be understood for any other condition of operation. In general, for given target echo and a given jamming signal occurring within the region between the major axes of the two lobes, the servomotors will operate the antenna and the injected pulse attenuator until the amplitudes of the pulses in the output of the receiver due to the echoes and injected pulses are such that the echo amplitudes of both lobes are equalized with their respective accompanying injected pulses, which condition will occur when the antennas are on-target. If no jamming is present, all four pulses are equal. This condition is also true if the jamming equally affects both lobes, a condition which exists when both the target echoes and the jamming signals arrive along the same directional axis. When the jamming signals and target echoes are not along the same directional axis, so that one lobe is affected to a greater extent than the other, then the two echo outputs will not be equal to each other when the antenna is on-target, but each echo output will still be equal to its accompanying injected pulse output, because the receiver will always amplify each pair of pulses in the same ratio and the attenuator servo tends to equalize the injected signal with its respective echo signal. If this equalization were not provided for, a tracking error dependent upon the degree of jamming would exist.

Although I have described my invention as applied to a pulse echo system, it is equally applicable to direction finding systems, or any other system involving the comparison of the outputs of a plurality of signal channels. In addition, it need not be restricted to use in overcoming any inequalities due to jamming or saturation of the signal channels. It is also useful where any inequalities exist in a plurality of channels which, in accordance with prior practice, must translate signals equally.

For example, as above mentioned, lobe-switch 58 comprises two amplifiers whereby the system consists essentially of two channels which, in this case, have a portion in common, and means for comparing the outputs of said channels. In accordance with prior practice, it was necessary to carefully match both channels so that they would equally translate the signal. By use of the present invention, these amplifiers need not be matched if the sampling signal is injected at points ahead of said channels. Thus, even if the amplifiers are not matched, the comparison of the signal outputs can still be used to provide proper automatic tracking.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

I claim:

1. An automatic bearing-tracking system for a pulse-echo apparatus comprising an antenna system having a pair of differently-directed lobes, a receiver, means to alternately impress the energy received by said antenna system along the respective lobes upon the input of said receiver, means to impress a sampling pulse upon said receiver at a time slightly displaced from the reception of each echo, and means responsive to the output of said receiver to rotate said antenna until the ratio of the echo output relative to the sampling pulse output reaches a predetermined relationship.

2. A wave translating system comprising a directional wave-detecting array having at least a pair of differently-directed response lobes, a receiver, and means for alternately coupling the energy received by said array along the respective lobes to the input of said receiver and simultaneously varying the gain of said receiver, whereby the response of the receiver to the energy received along the respective lobes is varied.

3. A wave translating system comprising a directional antenna array having at least a pair of divergent, partially-overlapping response lobes, a receiver, a voltage-controlled gain-control for said receiver, voltage-controlled switching means for alternately coupling the energy received along the respective antenna lobes to the input of said receiver, and a common voltage source for simultaneously operating said switching means and said gain control, whereby the response of the receiver to the energy received along the respective lobes is varied.

4. The method of automatic bearing tracking by means of a pulse-echo wave-energy apparatus including a rotatable wave-detecting array having a pair of divergent, partially-overlapping response lobes and a receiver upon the input circuit of which pulses received along the respective lobes are alternately impressed, wherein a jamming signal unequally received along the respective lobes tends to vary the response of said receiver; comprising the steps of injecting a sampling pulse into an input circuit of the receiver in timed relation with each received echo pulse, whereby there will be derived in the output of said receiver two groups of echo pulses and two groups of sampling pulses respectively accompanying said echo pulses, segregating each of said pulse groups, separately comparing each echo group with its respective sampling pulse group to derive a pair of resultant potentials each of which has a polarity dependent upon which type of pulse group predominates, varying under the control of one of said resultant potentials the amplitude of one of said injected-pulse groups so as to tend to equalize it with that of the echo pulse group which it accompanies, combining said resultant potentials, and rotating under the control of said combined potentials said wave-detecting array until the amplitudes of the echo pulse groups received along the respective lobes are equal to the amplitudes of their respective accompanying derived injected pulse groups.

5. The method of automatic bearing tracking by means of a pulse-echo radio apparatus including a rotatable antenna array having a pair of divergent, partially-overlapping response lobes and a receiver upon the input circuit of which pulses received along the respective lobes are alternately impressed, wherein a jamming signal unequally received along the respective lobes tends to vary the response of said receiver; comprising the steps of injecting a sampling pulse into an input circuit of the receiver at a time which is slightly displaced from each received echo pulse, whereby there will be derived in the output of said receiver two groups of echo pulses and two groups of sampling pulses respectively accompanying said echo pulses, segregating each of said pulse groups, separately integrating said segregated pulse groups, separately comparing the integrated energy of each echo group with the integrated energy of their respective sampling pulse groups to derive a pair of resultant potentials each of which has a magnitude dependent upon the difference in amplitude between the integrated energies of a given echo and injected pulse group, and a polarity dependent upon which type of pulse group predominates, varying under the control of one of said resultant potentials the amplitude of one of said injected pulse groups so as to tend to equalize it with that of the echo pulse group which it accompanies, combining said resultant potentials, and rotating under the control of said combined potentials said antenna array until the integrated amplitudes of the echo pulse groups received along the respective lobes are equal to the integrated amplitudes of their respective accompanying derived injected pulse groups.

6. An automatic bearing-tracking, pulse-echo, object-location system comprising a directional wave-detecting array having at least a pair of divergent, partially-overlapping response lobes, a receiver, means for alternately coupling the energy received by said antenna array along the respective lobes to the input of said receiver, a radio-frequency sampling pulse generator, means for injecting into the receiver a sampling pulse in timed relation with the reception of each echo-pulse, means for separating all echo pulses and injected pulses in the receiver output, a pair of voltage comparing circuits in said receiver output for comparing the amplitudes of the echo-pulses derived from the respective lobes and their accompanying injected pulses, means controlled by the output of one of said comparing circuits for varying the amplitude of said injected pulse until its amplitude is equal to the amplitude of the echoes received along one of said lobes, and means controlled by the combined output of both comparing circuits to rotate said wave-detecting antenna array until the integrated output amplitude of the echo-pulses received along each lobe is equal to the integrated output of the accompanying injected pulses.

7. An automatic bearing-tracking, pulse-echo, object-location system comprising a directional antenna array having at least a pair of divergent, partially-overlapping response lobes, a receiver, an electronic switch for alternately coupling energy received by said antenna array along the respective lobes to the input of said receiver, a square-wave voltage for operating said switch, a radio-frequency sampling pulse generator, means for injecting into the receiver a sampling pulse slightly displaced in time from the reception of each echo-pulse, means controlled by said square-wave voltage for separating all echo pulses and injected pulses in the receiver output, means for separately integrating all of said pulses, a pair of voltage comparing circuits for comparing the integrated echo-pulses received along the respective lobes and their accompanying injected pulses, means controlled by the output of one of said comparing circuits for varying the amplitude of said injected pulse until its integrated amplitude is equal to the integrated amplitude of the echoes received along one of said lobes, and means controlled by the combined output of both comparing circuits to rotate said antenna array until the integrated output of the echo-pulses received along each lobe is equal to the integrated output of the accompanying injected pulses.

8. In the method of automatic bearing tracking of intermittent signals by means of a receiver including a rotatable wave-detecting array having a pair of divergent response lobes and at least a pair of channels for separately translating the energy received along each lobe, which comprises the steps of injecting equal sampling pulses into the input circuits of said channels at times slightly displaced from the reception of each signal, separating the signals and the sampling pulses in the outputs of said channels, comparing and integrating the signal output with the sampling pulse output of either channel to derive a resultant output, and varying under the control of said resultant output the amplitude of said injected pulses.

9. The method of automatic bearing tracking of intermittent signals by means of a receiver including a rotatable wave-detecting array having a pair of divergent response lobes and at least a pair of channels for separately translating the energy received along each lobe, which comprises the steps of injecting equal sampling pulses into the input circuits of said channels at times slightly displaced from the reception of each signal, separating the signals and the sampling pulses in the outputs of said channels, comparing the signal output with the sampling pulse output of each channel to derive a pair of resultant outputs, and rotating under the control of both of said resultant outputs the rotation of said wave-detecting array until the ratios of the signal outputs with respect to their accompanying injected pulse outputs are equal.

10. The method of automatic bearing tracking of regularly-recurring intermittent signals by means of a receiver including a rotatable antenna array having a pair of divergent response lobes and at least a pair of channels for separately translating the energy received along each lobe, which comprises the steps of injecting equal sampling pulses into the input circuits of said channels at times slightly displaced from the reception of each signal, separating the signals and the sampling pulses in the outputs of said channels, comparing the signal output with the sampling pulse output of each channel to derive a pair of resultant outputs, and rotating under the control of said resultant outputs said antenna array until, in each channel, the ratio of each signal output with respect to its accompanying injected pulse output reaches a desired relation.

11. The method of automatic bearing tracking of regularly-recurring intermittent signals by means of a receiver including a rotatable antenna array having a pair of divergent, partially-overlapping response lobes and at least a pair of channels for separately translating the energy received along each lobe, which comprises the steps of injecting equal sampling pulses into the input circuits of said channels at times slightly displaced from the reception of each signal, separating the signals and the sampling pulses in the outputs of said channels, comparing and integrating the signal output with the sampling pulse output of each channel to derive a pair of resultant integrated outputs, varying under the control of one of said integrated outputs the amplitude of said injected pulses, and rotating under the control of both of said integrated outputs said antenna array until, in each channel, the integrated signal output is equal to the integrated output of the accompanying injected pulses.

12. A receiving system for automatically tracking the bearing of regularly-recurring intermittent signals, comprising a rotatable wave-detecting array having a pair of divergent response lobes, a pair of channels for separately translating the energy received along the respective lobes, means for injecting equal sampling pulses into the input circuits of said channels at times slightly displaced from the reception of each signal, means for separating the signals and the sampling pulses in the outputs of said channels, means for comparing the signal output with the sampling pulse output to derive a resultant output, and means controlled by said resultant output to vary the amplitude of said injected pulses.

13. A receiving system for automatically tracking the bearing of regularly-recurring intermittent signals, comprising a rotatable wave-detecting array having a pair of divergent response lobes, a pair of channels for separately translating the energy received along the respective lobes, means for injecting equal sampling pulses into the input circuits of said channels at times slightly displaced from the reception of each signal, means for separating the signals and the sampling pulses in the outputs of said channels, means for comparing the signal output with the sampling pulse output of each channel to derive a pair of resultant outputs, and means responsive to said resultant outputs to rotate said wave-detecting array until the ratios of the signal outputs with respect to their accompanying injected pulse outputs are equal.

14. A receiving system for automatically tracking the bearing of regularly-recurring intermittent signals, comprising a rotatable antenna array having a pair of divergent response lobes, a pair of channels for separately translating the energy received along the respective lobes, means for injecting equal sampling pulses into the input circuits of said channels at times slightly displaced from the reception of each signal, means for separating the signals and the sampling pulses in the outputs of said channels, means for comparing the signal output and sampling pulse output of each channel to derive resultant outputs, and means responsive to said resultant outputs to rotate said antenna array until, in each channel, the ratio of each signal output with respect to its accompanying injected pulse output reaches a desired relation.

15. In a radio pulse-echo object detection system, a receiver for automatically tracking the bearing of an echo-producing target, comprising a rotatable antenna array having a pair of divergent response lobes, a pair of channels for separately translating the energy received along the respective lobes, means for injecting equal sampling pulses into the input circuits of said channels at times slightly displaced from the reception of each echo, means for separating the echoes and the sampling pulses in the outputs of said channels, means for separately integrating the echo and sampling pulse outputs, and means for comparing the integrated echo output with the integrated sampling pulse output of each channel to derive a pair of resultant integrated outputs, means responsive to one of said resultant integrated outputs to vary the amplitude of said injected sampling pulses, and means responsive to both of said resultant integrated outputs to rotate said wave-detecting antenna array until, in each channel, the integrated echo output is equal to the integrated output of the accompanying injected pulses.

ARTHUR C. PRICHARD.

REFERENCES CITED

The following references are of record in the file of this patent:

UNITED STATES PATENTS

| Number | Name | Date |
|---|---|---|
| 2,312,203 | Wallace | Feb. 23, 1943 |
| 2,314,029 | Bond et al. | Mar. 16, 1943 |
| 2,360,810 | Carlson et al. | Oct. 17, 1944 |
| 2,400,641 | Hardy | May 21, 1946 |
| 2,418,143 | Stodola | Apr. 1, 1947 |